(12) United States Patent
Farha et al.

(10) Patent No.: US 10,069,175 B2
(45) Date of Patent: Sep. 4, 2018

(54) GROOVED COVER FOR BATTERY ARRAY

(71) Applicant: FORD GLOBAL TECHNOLOGIES, LLC, Dearborn, MI (US)

(72) Inventors: Eid Farha, Ann Arbor, MI (US); Temam Kedir, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 807 days.

(21) Appl. No.: 14/299,193

(22) Filed: Jun. 9, 2014

(65) Prior Publication Data
US 2015/0357682 A1 Dec. 10, 2015

(51) Int. Cl.
*H01M 10/42* (2006.01)
*H01M 10/48* (2006.01)
(Continued)

(52) U.S. Cl.
CPC ....... *H01M 10/4257* (2013.01); *B60L 11/123* (2013.01); *B60L 11/14* (2013.01); *B60L 11/1864* (2013.01); *B60L 11/1879* (2013.01); *B60L 15/20* (2013.01); *B60L 15/2009* (2013.01); *H01M 2/1077* (2013.01); *H01M 10/425* (2013.01); *H01M 10/482* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/486* (2013.01); *B60L 2240/545* (2013.01); *B60L 2240/547* (2013.01); *B60L 2240/549* (2013.01); *H01M 2/206* (2013.01); *H01M 2010/4271* (2013.01); *H01M 2220/20* (2013.01); *Y02T 10/6217* (2013.01);

(Continued)

(58) Field of Classification Search
CPC .......... H01M 10/4257; H01M 10/425; H01M 10/482; H01M 2/1077; H01M 2/206; H01M 2010/4271; H01M 2220/20; B60L 15/20; B60L 15/2009; B60L 11/123; B60L 11/14; B60L 11/1864; B60L 11/1879; B60L 2240/547; B60L 2240/545; B60L 2240/486; B60L 2240/443; B60L 2240/441; B60L 2240/423; B60L 2240/421; B60L 2240/12; B60L 2240/549; Y02T 10/7077; Y02T 10/7005; Y02T 10/7061; Y02T 10/72; Y02T 10/6217; Y02T 10/7275; Y02T 10/645

See application file for complete search history.

(56) References Cited

U.S. PATENT DOCUMENTS 8,287,185 B2 10/2012 Pulliam et al.
8,598,884 B2 12/2013 Yano et al.
(Continued)

FOREIGN PATENT DOCUMENTS

WO WO2013002507 A1 * 1/2013
WO 2013061871 A1 5/2013

OTHER PUBLICATIONS

Machine translation for WO 2013/061871 (May 2, 2013).*

*Primary Examiner* — Eugenia Wang
(74) *Attorney, Agent, or Firm* — Carlson, Gaskey & Olds

(57) ABSTRACT

A battery array according to an exemplary aspect of the present disclosure includes, among other things, a circuit connector assembly and a cover that partially covers the circuit connector assembly. The cover includes a groove. A sense-line wire is received within the groove.

19 Claims, 5 Drawing Sheets

(51) Int. Cl.
  *H01M 2/10* (2006.01)
  *B60L 15/20* (2006.01)
  *B60L 11/12* (2006.01)
  *B60L 11/14* (2006.01)
  *B60L 11/18* (2006.01)
  *H01M 2/20* (2006.01)

(52) U.S. Cl.
  CPC .......... *Y02T 10/645* (2013.01); *Y02T 10/7005* (2013.01); *Y02T 10/7061* (2013.01); *Y02T 10/7077* (2013.01); *Y02T 10/72* (2013.01); *Y02T 10/7275* (2013.01)

(56) References Cited

U.S. PATENT DOCUMENTS

| | | | |
|---|---|---|---|
| 2006/0076923 A1* | 4/2006 | Eaves | G01T 1/2018 320/112 |
| 2010/0136392 A1* | 6/2010 | Pulliam | G01K 1/026 429/90 |
| 2012/0171908 A1* | 7/2012 | Henmi | H01M 2/1083 439/761 |
| 2012/0212232 A1 | 8/2012 | Ikeda et al. | |
| 2012/0242144 A1 | 9/2012 | Chorian et al. | |
| 2013/0010449 A1 | 1/2013 | Ikeda et al. | |
| 2013/0164592 A1 | 6/2013 | Maguire et al. | |
| 2013/0273412 A1 | 10/2013 | Okada et al. | |
| 2013/0302651 A1 | 11/2013 | Kim et al. | |
| 2014/0030581 A1 | 1/2014 | Kim | |
| 2014/0087221 A1* | 3/2014 | Kim | H01M 10/482 429/90 |

\* cited by examiner

GROOVED COVER FOR BATTERY ARRAY

TECHNICAL FIELD

This disclosure relates to a circuit connector assembly cover that includes a groove sized to receive sense-line wiring. The cover functions to both cover portions of the circuit connector assembly of the battery array, and retains and routes sense-line wiring of the battery array.

BACKGROUND

Electrified vehicles, such as hybrid electric vehicles (HEV's), plug-in hybrid electric vehicles (PHEV's), battery electric vehicles (BEV's), or fuel cell vehicles differ from conventional motor vehicles because they are powered by electric machines (i.e., electric motors and/or generators) instead of or in addition to an internal combustion engine. High voltage current for powering the electric machines is typically supplied by high voltage battery assemblies.

A battery assembly may be equipped with one or more battery arrays. Each battery array includes a plurality of battery cells that are supported relative to one another. The battery cells must be reliably connected to one another in order to achieve the necessary voltage and power levels for operating the electrified vehicle. Numerous parts, including but not limited to bus bars, individual sense-line wiring, multiple wiring retainers for routing the sense-line wiring, and sensors are typically required to electrically connect the battery cells.

SUMMARY

A battery array according to an exemplary aspect of the present disclosure includes, among other things, a circuit connector assembly and a cover that partially covers the circuit connector assembly. The cover includes a groove. A sense-line wire is received within the groove.

In a further non-limiting embodiment of the foregoing battery array, the cover includes an external face, the groove extending longitudinally across the external face.

In a further non-limiting embodiment of either of the foregoing battery arrays, the groove is positioned at a first distance from an end wall of the cover and a battery terminal of the battery array is positioned at a second distance from the end wall.

In a further non-limiting embodiment of any of the foregoing battery arrays, the first distance is a greater distance than the second distance.

In a further non-limiting embodiment of any of the foregoing battery arrays, the first distance is a smaller distance than the second distance.

In a further non-limiting embodiment of any of the foregoing battery arrays, the groove is positioned at a first distance from an end wall of the cover, the first distance disposed between a second distance of a first battery terminal from the end wall and a third distance of a second battery terminal from the end wall.

In a further non-limiting embodiment of any of the foregoing battery arrays, the groove is positioned between a bus bar and a sensor of the circuit connector assembly.

In a further non-limiting embodiment of any of the foregoing battery arrays, a secondary groove is connected to the groove.

In a further non-limiting embodiment of any of the foregoing battery arrays, a wiring branch extends within the secondary groove between the sense-line wire and a sensor.

In a further non-limiting embodiment of any of the foregoing battery arrays, the sensor is a voltage sensor.

In a further non-limiting embodiment of any of the foregoing battery arrays, the secondary groove is perpendicular to the groove.

In a further non-limiting embodiment of any of the foregoing battery arrays, the sense-line wire connects to a control module.

A battery array according to another exemplary aspect of the present disclosure includes, among other things, a battery cell including a terminal, a bus bar connected to the terminal, an integrated circuit board electrically connected to the bus bar, an integrated circuit board cover at least partially covering the bus bar, the integrated circuit board cover including a groove and sense-line wiring retained within the groove.

In a further non-limiting embodiment of the foregoing battery array, the integrated circuit board cover completely conceals the terminal and the bus bar.

In a further non-limiting embodiment of either of the foregoing battery arrays, the integrated circuit board cover is positioned on a side of the battery cell.

In a further non-limiting embodiment of any of the foregoing battery arrays, the integrated circuit board cover is positioned over top of the battery cell.

In a further non-limiting embodiment of any of the foregoing battery arrays, the groove extends longitudinally across an external face of the integrated circuit board cover.

A method according to another exemplary aspect of the present disclosure includes, among other things, covering portions of a circuit connector assembly of a battery array with a cover, and retaining and routing sense-line wiring of the battery array in a groove of the cover.

In a further non-limiting embodiment of the foregoing method, the covering step includes completely concealing at least a bus bar of the circuit connector assembly.

In a further non-limiting embodiment of either of the foregoing methods, the method includes pressing the sense-line wiring into the groove and pressing wiring branches that extend from the sense-line wiring into secondary grooves.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a circuit connector assembly cover for a battery array. The cover functions to cover portions of the circuit connector assembly of the battery array, and to retain and route sense-line wiring of the battery array. The cover includes a groove sized to accommodate the sense-line wiring. The sense-line wiring may be routed along a side or top of the battery array via the groove to reduce the packaging space required by the battery array. These and other features are discussed in greater detail in the following paragraphs.

Figure 1:
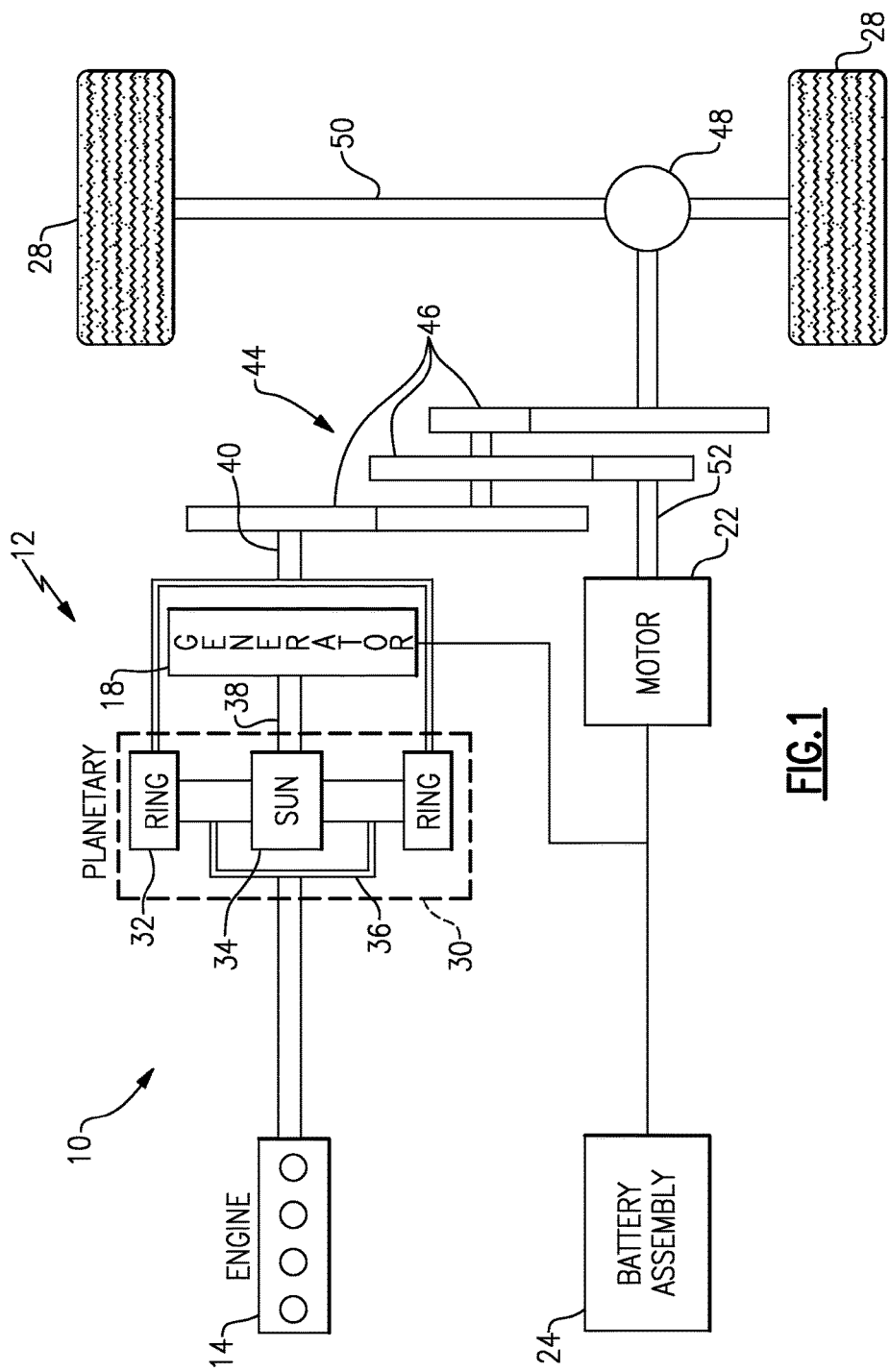
FIG. 1 schematically illustrates a powertrain of an electrified vehicle.

FIG. 1 schematically illustrates a powertrain 10 for an electrified vehicle 12. Although depicted as a HEV, it should be understood that the concepts described herein are not limited to HEV's and could extend to other electrified vehicles, including, but not limited to, PHEV's and BEV's.

In one non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12.

The engine 14, which may include an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an exemplary type of electrified vehicle battery assembly. The battery assembly 24 may include a high voltage battery pack having one or more battery arrays that are capable of outputting electrical power to operate the motor 22 and the generator 18. Other types of energy storage devices and/or output devices can also be used to electrically power the electrified vehicle 12.

Figure 2:
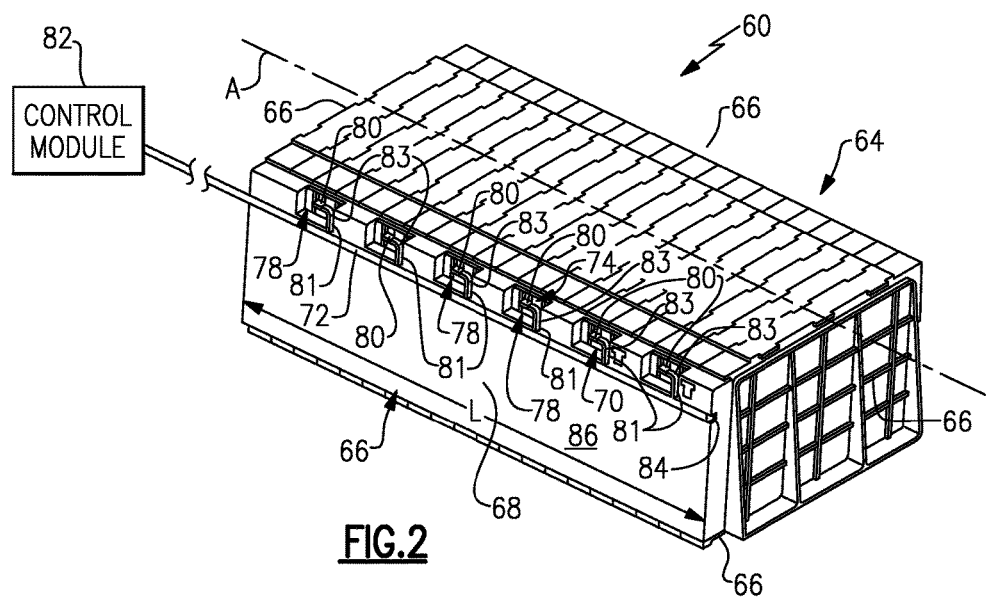
FIG. 2 illustrates a battery array of an electrified vehicle.
Figure 3:
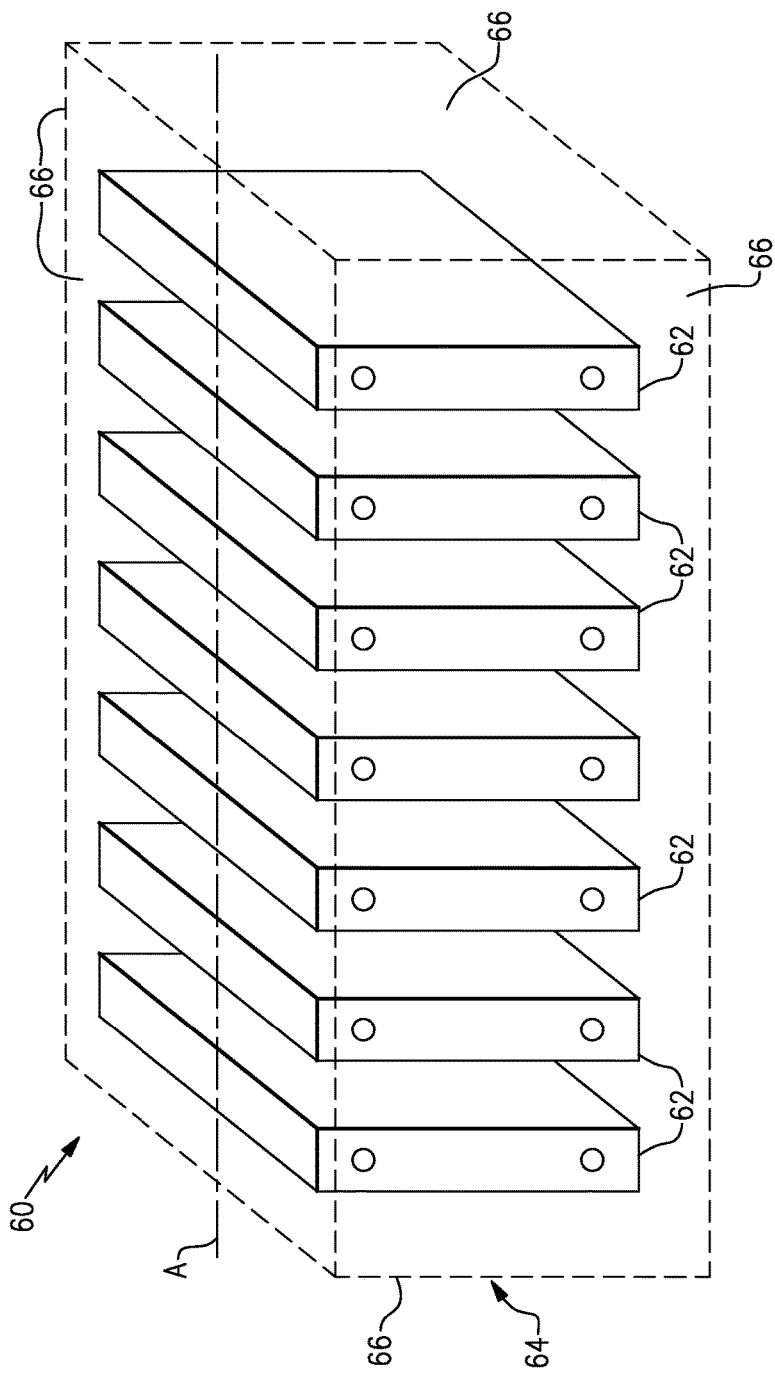
FIG. 3 illustrates the battery array of FIG. 2 with a housing of the battery array shown in phantom.

FIGS. 2 and 3 illustrate a battery array 60 that can be incorporated into an electrified vehicle, such as the electrified vehicle 12 of FIG. 1. For example, the battery array 60 may be part of the battery assembly 24 shown in FIG. 1. The battery assembly 24 could include a plurality of battery arrays similar to the battery array 60 that are stacked or decked relative to one another. However, this disclosure is not limited to a battery assembly having a specific number of battery arrays.

The battery array 60 may include a plurality of battery cells 62 that are housed within a housing 64. The housing 64 is shown in solid lines in FIG. 2 such that the battery cells 62 are not visible. The battery cells 62 are best illustrated in FIG. 3, which illustrates the housing 64 in phantom lines. The battery array 60 may include any number of battery cells, and this disclosure is not limited to the specific number of cells depicted by FIG. 3.

The battery cells 62 are arranged, or stacked horizontally, along a longitudinal axis A between opposing walls 66 of the housing 64. The housing 64 may include a plurality of walls 66 that surround the battery cells 62 of the battery array 60. Although not shown, spacers or separates can be disposed between the adjacent battery cells 62 inside of the housing 64.

The battery cells 62 may be pouch type cells. In one embodiment, the battery cells 62 are lithium ion cells. However, other electrochemical battery cell types are also contemplated.

In one embodiment, one of the walls 66 that form the housing 64 includes a cover 68 (see FIG. 2), which may also be referred to as an ICB cover. The cover 68 may be attached to one or more of the walls 66. In another embodiment, the cover 68 itself establishes one of the walls 66 of the housing 64. The cover 68 could be attached in numerous ways to one or more of the walls 66. For example, the cover 68 could be bolted, snapped-on, or connected to a tray of the battery assembly rather than to the battery array 60.

The cover 68 is adapted to provide the dual functions of both covering portions of a circuit connector assembly 70 that electrically connects the battery cells 62 of the battery array 60, and retaining sense-line wiring 72 that connects the circuit connector assembly 70 of the battery array 60 to a control module 82. For example, the cover 68 may at least partially cover, surround and/or conceal an integrated circuit board (ICB) 74 and/or one or more bus bars 76 (see FIG. 4) of the circuit connector assembly 70. The circuit connector assembly 70 may be made up of any combination of components that provide a circuit connection within the battery array 60.

In addition to covering portions of the battery array 60, and in particular portions of the circuit connector assembly 70, the cover 68 may also retain the sense-line wiring 72 of the battery array 60 and route the sense-line wiring 72 to the control module 82. In one embodiment, the cover 68 includes a groove 84 formed on an external face 86 of the cover 68. The sense-line wiring 72 may be press fit or snapped into the groove 84. The groove 84 may extend longitudinally across an entire length L of the external face 86, and may extend in parallel to the longitudinal axis A. In one embodiment, the external face 86 faces away from an interior of the housing 64. In other words, the external face 86 faces away from the battery cells 62.

The cover 68 may additionally include secondary grooves 81 that connect to the groove 84. In one embodiment, the secondary grooves 81 are perpendicular to the groove 84. The secondary grooves 81 may receive wiring branches 83 of the sense line wiring 72. The wiring branches 83 connect to sensors 80 of the circuit connector assembly 70. Information collected by the sensors 80 can be communicated to and monitored by the control module 82 through the wiring branches 83 and the sense-line wiring 72.

The cover 68 may include cut-outs 78 for accommodating the sensors 80 of the circuit connector assembly 70. In other words, the sensors 80 may be partially exposed by the cover 68 for connecting the sensors 80 to the sense-line wiring 72 after the cover 68 is in place. The sense-line wiring 72 connects to the control module 82 for monitoring the functionality of the battery array 60. In one non-limiting embodiment, the control module 82 is a battery electronic control module.

Figure 4:
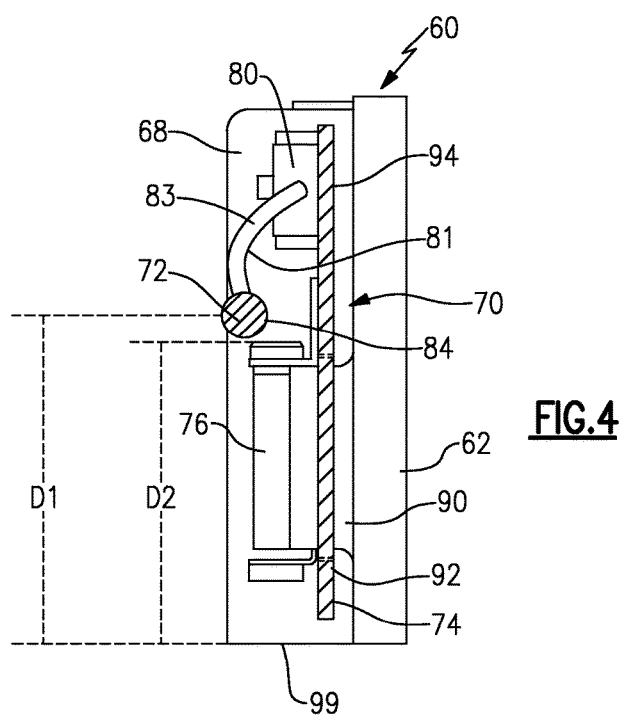
FIG. 4 illustrates a cross-sectional view of a battery array according to a first embodiment of this disclosure.

FIG. 4, with continued reference to FIGS. 2 and 3, illustrates a cross-sectional view of portions of the battery array 60. This view better illustrates some features of the cover 68, the components of the circuit connector assembly 70, and the relationship of the cover 68 relative to the circuit connector assembly 70.

In one embodiment, the circuit connector assembly 70 includes the ICB 74, bus bars 76 (only one shown in FIG. 4), sense-line wiring 72, and the sensors 80 (only one shown in FIG. 4). The circuit connector assembly 70 provides an integrated circuit for electrically connecting the battery cells 62 of the battery array 60. The circuit connector assembly 70 may connect the battery cells 62 in a series string or a parallel string.

The ICB 74 is electrically connected to a terminal 90 of each battery cell 62. Each battery cell 62 may include terminals 90 having both positive and negative polarities. In this embodiment, the positive and negative terminals 90 are disposed on opposite sides of the battery cell 62 such that only one terminal 90 of each battery cell 62 is connected to the ICB 74. The ICB 74 may include openings 92 for receiving the terminals 90. In this way, the terminals 90 support the ICB 74 relative to the battery cells 62.

The ICB 74 also establishes a mounting platform for the sensors 80. The ICB 74 may include openings 94 for accommodating the sensors 80. In one embodiment, the sensors 80 are voltage sensors. In another embodiment, the sensors 80 are temperature sensors. Other sensors are also contemplated as within the scope of this disclosure.

Wiring branches 83 extend within the secondary grooves 81 from the sensors 80 to the sense-line wiring 72. The sense-line wiring 72 transfers measurement signals from the sensors 80 and/or the ICB 74 to the control module 82 (see FIG. 2). The control module 82 may be programmed to monitor the measurement signals received from the sensors 80 and/or ICB 74, such as to prevent overcharging of the battery cells 62. The control module 82 could additionally be programmed to perform multiple other functions related to the battery array 60.

The bus bar 76 is also connected to the terminal 90. The bus bar 76 electrically connects the terminal 90 to an adjacent terminal of an adjacent battery cell, which in FIG. 4 is directly behind the battery cell 62. In one embodiment, the bus bars 76 connect adjacent terminals that have opposite polarities (i.e., negative to positive or positive to negative). The bus bars 76 are also electrically connected to the ICB 74.

In one embodiment, the bus bars 76 are stamped, relatively thin strips of metal that are configured to conduct power generated by the battery cells 62. Example bus bar materials include copper, brass or aluminum, although other materials having conductive properties may also be suitable. In one embodiment, the bus bars 76 are high current bus bars having relatively high amperage capacities.

Figure 5:
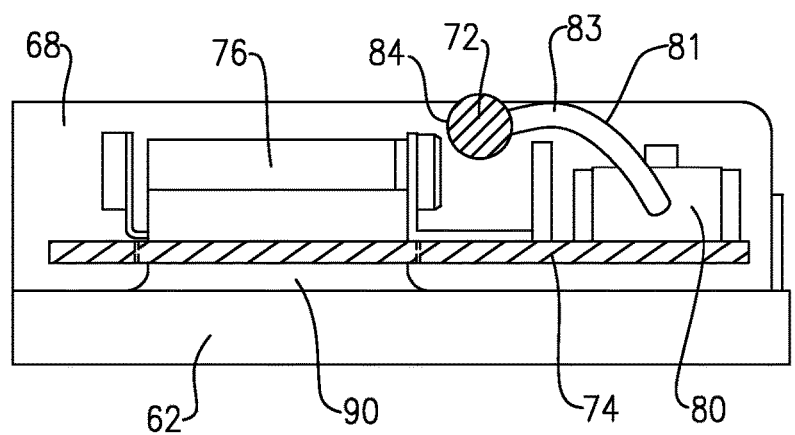
FIG. 5 illustrates a cross-sectional view of a battery array according to a second embodiment of this disclosure.

In one embodiment, the cover 68 completely conceals the bus bars 76 and the terminals 90 and at least partially conceals the ICB 74. The cover 68 may be positioned on a side of the battery cells 62 of the battery array 60. In another embodiment, the cover 68 may be positioned on top of the battery cells 62 (see FIG. 5). The actual placement and positioning of the cover 68 will depend on the battery assembly design, packaging considerations, and other factors.

Figure 6:
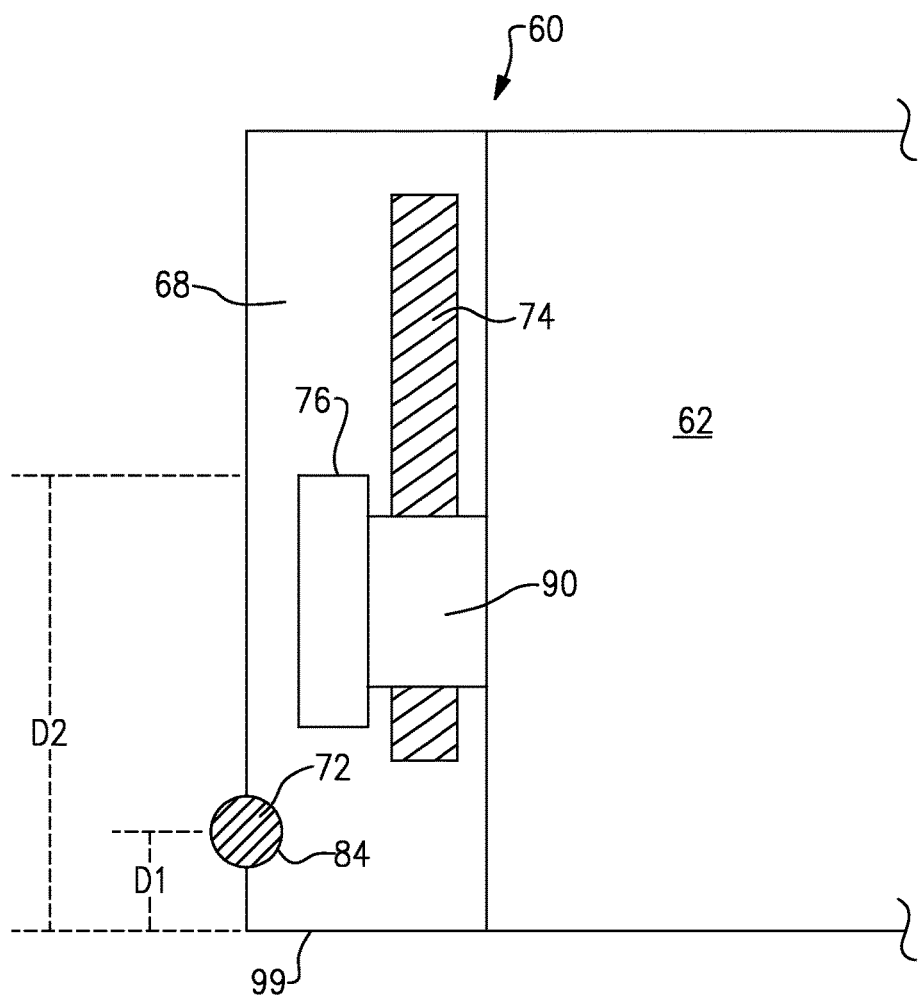
FIG. 6 illustrates a cross-sectional view of a battery array according to yet another embodiment of this disclosure.

In one embodiment, the groove 84 of the cover 68 is positioned at a first distance D1 from an end wall 99 of the cover 68 that is a larger distance than a second distance D2 between the end wall 99 and the terminal 90. In another embodiment, the groove 84 is disposed at a first distance D1 from the end wall 99 of the cover 68 that is a smaller distance than a second distance D2 between the end wall 99 and the terminal 90 (see FIG. 6). Other locations for the groove 84 are also contemplated.

Figure 7:
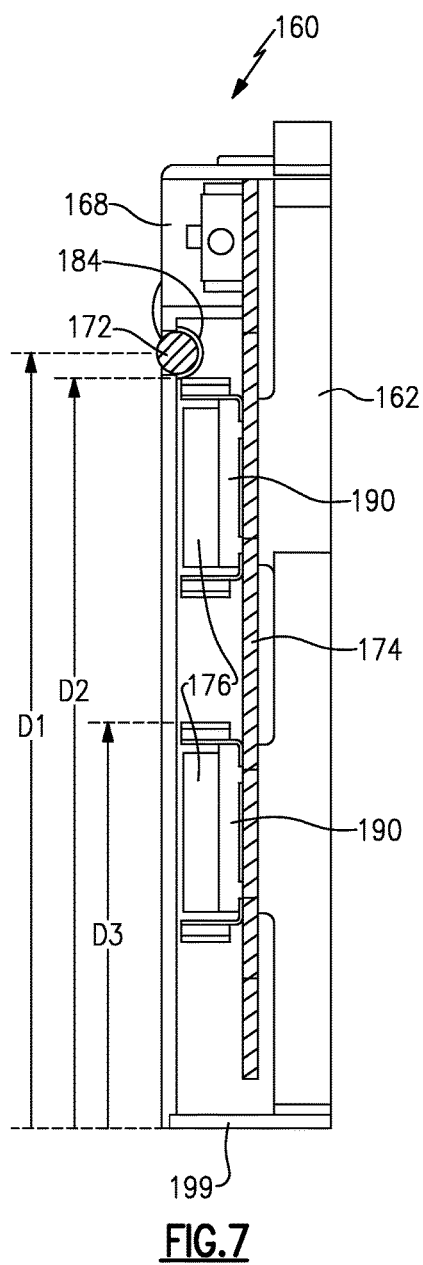
FIG. 7 illustrates another exemplary battery array.

FIG. 7 illustrates another embodiment of a battery array 160. In this disclosure, like reference numbers designate like elements where appropriate and reference numerals with the addition of 100 or multiples thereof designate modified elements that are understood to incorporate the same features and benefits of the corresponding original elements.

Figure 8:
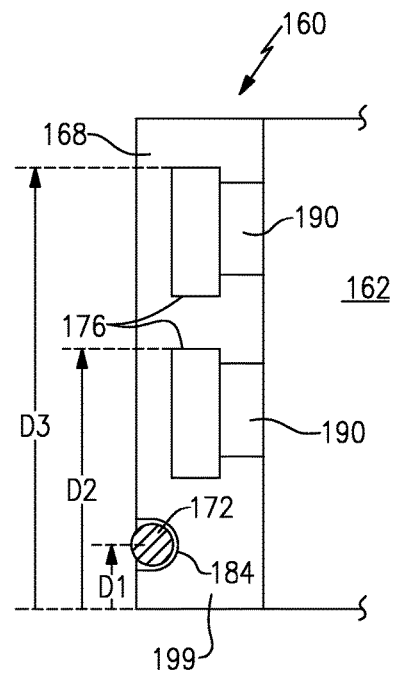
FIG. 8 illustrates a cross-sectional view of a battery array according to another embodiment of this disclosure.
Figure 9:
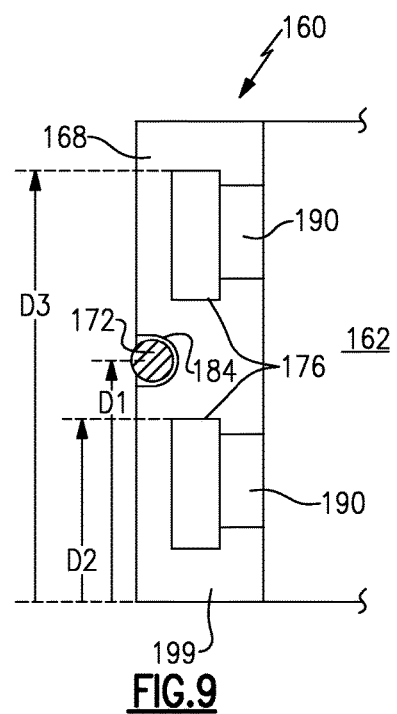
FIG. 9 illustrates a cross-sectional view of a battery array according to another embodiment of this disclosure.

In this embodiment, both the positive and negative terminals 190 of the battery cells 162 are disposed on the same side of the battery cells 162. The cover 168 may cover or conceal the bus bars 176, the terminals 190, and portions of the ICB 174. The cover 168 includes a groove 184 for routing sense-line wiring 172. In this non-limiting embodiment, the groove 184 is positioned at a first distance D1 from an end wall 199 of the cover 168 that is a greater distance than distances D2, D3 that extend between the end wall 199 and the terminals 190. The first distance D1 could alternatively be a smaller distance than distances D2, D3 (see FIG. 8). In yet another embodiment, the first distance D1 is a distance between the distances D2 and D3 (see FIG. 9).

It should be understood that the various embodiments shown in FIGS. 2-9 are not necessarily drawn to scale and are for illustrative purposes only. The exemplary grooved covers of this disclosure may reduce the number of wiring retainers required to route sense-line wiring, increase packaging space of the battery assembly, and simplify battery array assembly.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery array, comprising:
   a circuit connector assembly including a circuit board, a bus bar, a sensor, and a sense-line wire;
   a cover that at least partially covers said circuit connector assembly, said cover including a first groove and a secondary groove;
   said sense-line wire received within said first groove,
   a wiring branch of said sense-line wire received within said secondary groove and extending from said sensor to said sense-line wire.

2. The battery array as recited in claim 1, wherein said cover includes an external face, said first groove extending longitudinally across said external face.

3. The battery array as recited in claim 1, wherein said first groove is positioned at a first distance from an end wall of said cover and a battery terminal of said battery array is positioned at a second distance from said end wall.

4. The battery array as recited in claim 3, wherein said first distance is a greater distance than said second distance.

5. The battery array as recited in claim 3, wherein said first distance is a smaller distance than said second distance.

6. The battery array as recited in claim 1, wherein said first groove is positioned at a first distance from an end wall of said cover, said first distance disposed between a second distance of a first battery terminal from said end wall and a third distance of a second battery terminal from said end wall.

7. The battery array as recited in claim 1, wherein said first groove is positioned between said bus bar and said sensor of said circuit connector assembly.

8. The battery array as recited in claim 1, wherein said secondary groove is connected to said first groove.

9. The battery array as recited in claim 8, wherein said secondary groove is perpendicular to said first groove.

10. The battery array as recited in claim 1, wherein said sensor is a voltage sensor.

11. The battery array as recited in claim 1, wherein said sense-line wire connects to a control module.

12. The battery array as recited in claim 1, wherein said cover establishes a side wall of said battery array or is directly attached to said side wall of said battery array.

13. The battery array as recited in claim 1, wherein said circuit board includes a first opening for accommodating a battery cell terminal and a second opening for accommodating a sensor.

14. A battery array, comprising:
    a battery cell including a terminal;
    a bus bar connected to said terminal;
    an integrated circuit board electrically connected to said bus bar and completely concealing said terminal and said bus bar;
    an integrated circuit board cover at least partially covering said bus bar, said integrated circuit board cover including a groove formed on an external face of said integrated circuit board cover; and
    sense-line wiring retained within said groove.

15. The battery array as recited in claim 14, wherein said integrated circuit board cover is positioned on a side of said battery cell.

16. The battery array as recited in claim 14, wherein said integrated circuit board cover is positioned over top of said battery cell.

17. The battery array as recited in claim 14, wherein said groove extends longitudinally across said external face of said integrated circuit board cover.

18. The battery array as recited in claim 14, wherein said integrated circuit board cover is positioned entirely on a single side of said battery cell.

19. A battery array, comprising:
    a battery cell including a terminal;
    a bus bar connected to said terminal;
    an integrated circuit board electrically connected to said bus bar;
    an integrated circuit board cover at least partially covering said bus bar, said integrated circuit board cover including a groove formed on an external face of said integrated circuit board cover; and
    sense-line wiring retained within said groove,
    wherein said groove extends longitudinally across an entire length of said external face.

* * * * *